United States Patent
Toyota et al.

(10) Patent No.: US 6,338,516 B1
(45) Date of Patent: *Jan. 15, 2002

(54) REAR BODY STRUCTURE FOR VEHICLE

(75) Inventors: Minoru Toyota; Yasuyuki Kimura; Koji Nakao, all of Hiroshima (JP)

(73) Assignee: Mazda Motor Corporation, Hiroshima (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/257,175

(22) Filed: Feb. 25, 1999

(30) Foreign Application Priority Data

Feb. 26, 1998 (JP) .......................... 10-045148

(51) Int. Cl.⁷ ................................. B62D 9/00
(52) U.S. Cl. .................... 296/37.2; 296/64; 296/65.09; 296/65.16
(58) Field of Search ............... 296/64, 65.05, 296/65.09, 65.16, 37.2, 69

(56) References Cited

U.S. PATENT DOCUMENTS

| | | | |
|---|---|---|---|
| 4,727,052 A | | 2/1988 | Wan et al. |
| 4,991,898 A | * | 2/1991 | Nomura ..................... 296/37.2 |
| 5,230,544 A | * | 7/1993 | Morritt et al. ........... 296/65.05 |
| 5,490,977 A | | 2/1996 | Wan et al. |
| 5,492,386 A | * | 2/1996 | Callum ........................ 296/64 |
| 5,662,368 A | * | 9/1997 | Ito et al. ................... 296/65.05 |
| 5,667,258 A | | 9/1997 | Kurokawa et al. |
| 5,839,773 A | * | 11/1998 | Ban et al. ................. 296/65.09 |
| 5,868,451 A | * | 2/1999 | Uno et al. ................. 296/65.05 |
| 5,871,255 A | * | 2/1999 | Harland et al. ............. 297/257 |
| 5,975,612 A | * | 11/1999 | Macey et al. .................. 296/66 |
| 6,089,641 A | * | 7/2000 | Mattarella et al. ............ 296/64 |
| 6,196,613 B1 | * | 3/2001 | Arai ........................ 296/65.13 |

FOREIGN PATENT DOCUMENTS

| | | |
|---|---|---|
| DE | 39 11264 A1 | 10/1990 |
| DE | 197 42 705 A 1 | 4/1998 |
| EP | 0 485 180 A1 | 5/1992 |
| EP | 0 507 590 A1 | 10/1992 |
| EP | 0 822 005 A2 | 2/1998 |
| FR | 2 687 629 | 8/1993 |
| JP | 6-11906 | 3/1994 |
| WO | WO 83/03081 | 9/1983 |

* cited by examiner

Primary Examiner—Stephen T. Gordon
Assistant Examiner—Paul Chenevert
(74) Attorney, Agent, or Firm—Nixon Peabody LLP; Donald R. Studebaker

(57) ABSTRACT

Disclosed herein is a vehicle rear body structure to reduce the amount of the transformation of the vehicle rear body portion for the back row seat in the event of the rear end collision. A pair of the rear wheel houses (51) are formed at the back part of a floor panel. A suspension tower (52) is formed to the rear wheel house (51). The pan (53) is formed nearly in the center part in the traverse direction of the floor panel 1 behind the suspension tower (52). The pan (53) is formed like the plate so as to being opened upward. The bottom of the pan (53) is substantially horizontal. The spare tire (54) is kept substantially horizontal in the pan (53).

20 Claims, 11 Drawing Sheets

REAR BODY STRUCTURE FOR VEHICLE

BACKGROUND OF THE INVENTION

1. Field of the Invention

The present invention is directed to a rear body structure for a vehicle.

2. Description of Related Art

A spare tire is often loaded on a rear section of a vehicle body. Japanese Utility Model Publication No.6-11906 has disclosed a storage pan for storing a spare tire. The storage pan is formed as the rear part of a floor panel and inclines to the front so as to carry a spare tire inclined forward up thereon. Because of the inclined position, the spare tire allows a rear body section of the vehicle to be appropriately crushed without thrusting the rear body section in an event where the vehicle is collided from the back.

Some types of vehicles are provided with rear seats with a small space to a rear wall of the vehicle body. For instance, a vehicle having three rows of seats arranged in a lengthwise direction from the front to the back of the vehicle or a vehicle having a short overall body length even though it has only two rows of seats are unavoidably restrained from providing a long distance or a large space between the rear seats and the rear wall of the vehicle body.

In such a vehicle which has only a short distance or a small space between the rear wall of the vehicle body and the rear row of seats, it is unavoidable to prevent the rear body section from crushing and thrusting at the back seats in an event of a collision from the back. In other words, it is essential to provide a reliable safety space behind the rear seats. While it is possible to provide the safety of passengers, in particular, seating on the rear seats by significantly increased strength of the rear body portion, it is not always desirable because it is accompanied by an increased w eight of th e rear body section.

SUMMARY OF THE INVENTION

It is therefore an object of the invention to provide a rear body structure for a vehicle body which significantly reduce crush or deformation of the rear body section toward the rear seats in an event of a collision from the back.

It is another object of the invention to provide a rear body structure for a vehicle body which has a structural strength increased without being accompanied by an increase in weight.

It is another object of the invention to provide a rear body structure for a vehicle body which can carry a spare tire with an effect of working to reduce deformation of the rear body section toward the rear seats in an event of a rear end collision.

The above objects are accomplished by providing a rear body structure for a vehicle body which comprises a floor panel with a pan opening upward for storing a spare tire therein formed at a rear section behind a part thereof to which suspension towers for rear wheels are installed and a seat having a seat cushion located to overlap the pan.

According to the rear body structure of the invention, a spare tire, which has high rigidity and is hard to be deformed, can thrust the rear body section to reduce deformation of the back section toward the rear seats due to a rear end collision. In particular, upon an occurrence of a rear end collision, the layout in which the seat cushion of the rear seat is situated above the spare tire prevents the spare tire from rising up due to an impact from the rear end so as to make the spare tire itself stretch sufficiently.

The seat cushion is may be desirably located above at least a front part of the pan. In this instance, while the spare tire at, in particular, its front end, which is apt to rise up during a rear end collision, is prevented from rising up. Further, it is unnecessary to locate the rear seats as backward as possible in order to prevent the spare tire from rising up.

The seat, and hence the seat cushion located above the spare tire, is pivotally supported so as to swivel forward. With this simple structure, the spare tire can be loaded onto and unloaded from the pan.

The seat may be adapted to be detachably mounted above the spare tire. In this case, guide rails formed with guide surfaces guide back and forth sliding movement of the seat supporting the weight of the seat, which is always desirable to enable a parson to easily dismount and reinstall the seat.

BRIEF DESCRIPTION OF THE DRAWINGS

The foregoing and other objects and features of the present invention will become apparent to those skilled in the art to which the present invention relates by reading the following detailed description of a preferred embodiment when considered in connection with the accompanying drawings, in which.

DESCRIPTION OF PREFERRED EMBODIMENTS

Figure 1:
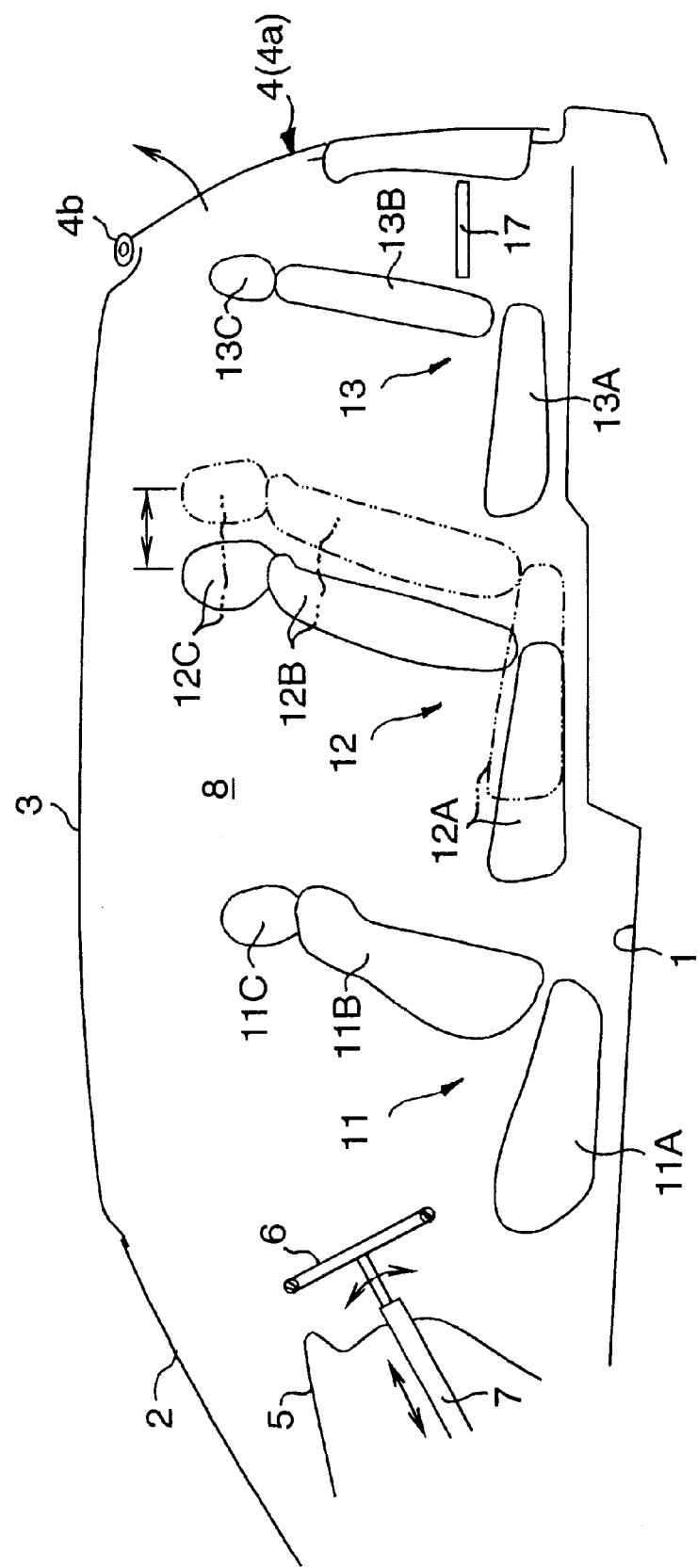
FIG. 1 is a schematic side view showing a rear body structure in accordance with an embodiment of the present invention in which each of seatbacks is in an upright position.

Referring to the drawings in detail and, in particular, to FIG. 1, a vehicle has a floor panel 1, a front windshield 2, a roof panel 3, a back door 4 and an instrument panel 5. The back door 4 has a rear windshield 4a and is pivotally mounted on a shaft 4b so as to turn between an open position and a closed position. The vehicle further has a steering wheel 6 mounted on a tip end of a steering shaft 7. A steering arrangement incorporates a tilt mechanism and a telescopic mechanism. The steering wheel 6 is adjustable in height and position by being swiveled up and down or back and forth.

A passenger compartment 8 is defined by and between the instrument panel 5 and the back door 4. In the passenger compartment there are installed three rows of seats arranged in the lengthwise direction of the vehicle, namely a first or front row of seats 11, a second or middle row of seat 12, and a third or rear row of seats 13. Each row of seats are disposed side by side in the transverse direction. The first row of seat 11 includes a driver's seat and a passenger's seat. The driver's seat and the passenger's seat are movable up and down or back and forth to adjust their positions.

The first row of seat 11, i.e. the driver's seat and the passenger's seat, comprise seat cushions 11A, seatbacks 11B and headrests 11C, respectively. The headrest 11C is detachably mounted to the seatback 11B. The driver's seat and the passenger's seat are independently adjustable their longitudinal positions and vertival height and able to independently recline the seatbacks 11B. Similarly, the second row of seats 12 comprise seat cushions 12A, seatbacks 12B and headrests 12C, respectively. The headrest 12C is detachably mounted to the seatback 12B. The second row seat 12 is adjustable its longitudinal position and vertical height and able to recline the seat cushion 12A. The second row of seats 12 are comprised of a single seat cushion 12A extending in the transverse direction and separate seatbacks 12B arranged side by side in the transverse direction. Between the two separate seatbacks, there is substantially no gap. The second row of seat 12 reclines the seatback 12B. The reclining mechanism adjusts the reclining position of the two seatbacks 12B, independently. The third row of seat 13 comprises a seat cushion 13A, a seatback 13B and a headrest 13C. The headrest 13C is detachably mounted to the seatback 13B. The third row of seat 13 is adjustable its longitudinal position and vertical height and able to recline the seat cushion 13A. The third row seat 13 has a reclining mechanism for the seatback 13B. The reclining mechanism adjusts the reclining position of the seatback 13B. The seat 13 are comprised of a single seat cushion 13A extending in the transverse direction and separate seatbacks 13B arranged side by side in the transverse direction. Between the two separate seatbacks, there is substantially no gap. The third row of seat 13 has a reclining mechanism for the seatback 13B. The reclining mechanism adjusts the reclining position of the two seatbacks 13B, independently.

The floor panel 1 has three stepped sections, namely a front panel section on which the front seats 11 are installed, a middle panel section on which the middle seats 12 are installed, and a rear panel section on which the rear seats 13 are installed. The front panel section is in the lowest position, and the rear panel section is in the highest position. The middle panel section is in a position between the front and rear panel sections. The seat cushions 11A, 12A, 13A have almost the same thickness as one another so as to provide almost the same seating comfort. The seat cushion 11A is in the lowest position, and the seat cushion 12A is somewhat higher than the seat cushion 11A, and the seat cushion 13A is in the highest position. The seatbacks 13B, 12B, 13B are different in thickness from one another. The thickness of the seatback 11B is the thickest, and the seatback 12B is somewhat thinner than the seatback 11B, and the seatback 13B is the thinnest. The maximum reclining angle of the seatback 13B is set smallest, and the maximum reclining angle of the seatback 11B is set largest. The maximum reclining angle of the seatback 12B is set between the maximum reclining angles of the seatback 11B and the seatback 13B. Each of the seatbacks 11B, 12B, 13B is folded forward through a reclining mechanism. In the folded position, each seatback 11B, 12B, 13B is folded on each seat cushion 11A, 12A, 13A and is situated substantially horizontally on the seat cushion 11A, 12A, 13A. The back of each seatback 11B, 12B, 13B is formed with a substantially flat surface which is situated to be substantially horizontal in the folded position so that goods and articles are put thereon.

Figure 2:
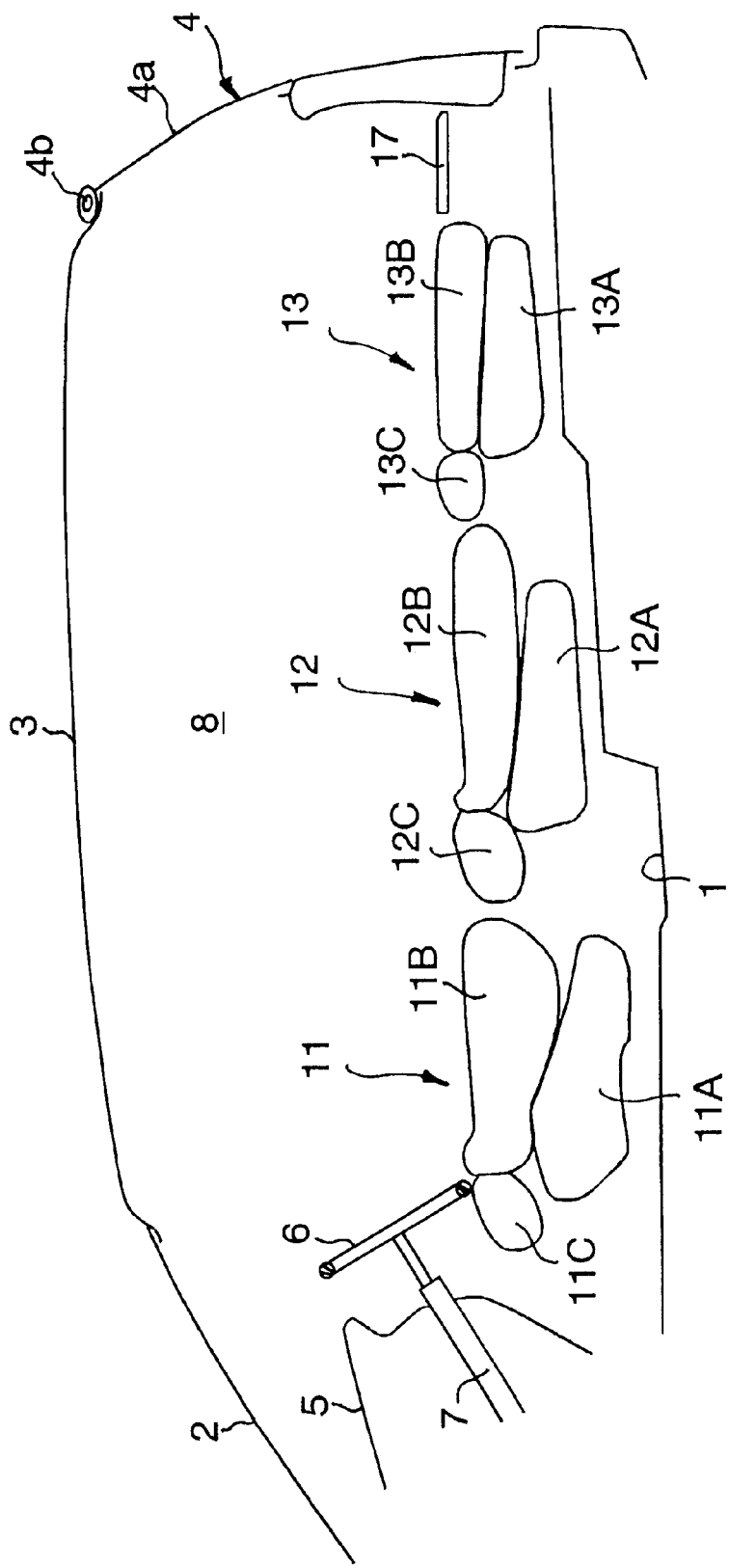
FIG. 2 is a schematic side view the rear body structure in which each seatback is in a folded position.

FIG. 2 shows the seatbacks 11B, 12B, 13B in the folded positions. The back of the seatbacks 11B, 12B, 13B are approximately even with one another by counterbalancing the differences in height among the seat cushions 11A, 12A, 13A with the differences in thickness of the seatbacks 11B, 12B, 13B, respectively. As a result, a large horizontal plane is provided over the back surfaces of the seatbacks 11B, 12B, 13B in the passenger compartment 8. Each of the seatbacks 11B, 12B, 13B is fallen forward with the headrest 11C, 12C, 13C remaining attached. In the folded position, the headrest 12C mounted to the seatback 12B is located in a space between the lower end of the seatback 11B and the upper end of the seatback 12B. Similarly, the headrest 13C mounted to the seatback 13B is located in a space between the lower end of the seatback 12B and the upper end of the seatback 13B. Because the space between the adjacent seatbacks 11B and 12B is occupied by the headrest 12C and the space between the adjacent seatbacks 12B and 13B is occupied by the headrest 13C, the plane formed over the backs of the seatbacks 11B, 12B and 13B has no large gap.

In order to avoid an interference of the seatback 11B of the driver's seat 11 in the folded position with the steering wheel 6, the maximum rear position into which the seat cushion 11A of the driver's seat 11 is permitted to slide back by the longitudinally sliding mechanism is determined such that the seatback 11B does not hit against the steering wheel 6 while the seatback 11B is folded down.

While the steering wheel 6 is in its maximum upper and forward position and the driver's seat is in the maximum rear position, the seatback 11B is folded forward down to the folded position without hitting against the steering wheel 6. In this instance, the seatback 11B may be designed and adapted to be folded down with the headrest 11C remaining attached thereto, or otherwise may be designed and adapted to be permitted to folded down only when the head rest 11C is detached therefrom.

By setting the maximum upper position of the steering wheel 6 higher, and/or the maximum upper position of the steering wheel 6 forward, the seatback 11B is more easily prevented from interfering with the steering wheel 6 during being folded down. In cases where the steering arrangement has only either a tilt mechanism or a telescopic mechanism or does not have a tilt mechanism nor a telescopic mechanism, the maximum rear position of the driver 'seat (the seat cushion 11A) may be set more backward. The seatback 11B may be folded forward down only after detaching the headrest 11C from the seatback 11B. Further, it is allowed that the seatback 11B of the driver's seat cannot be fallen forward.

Figure 3:
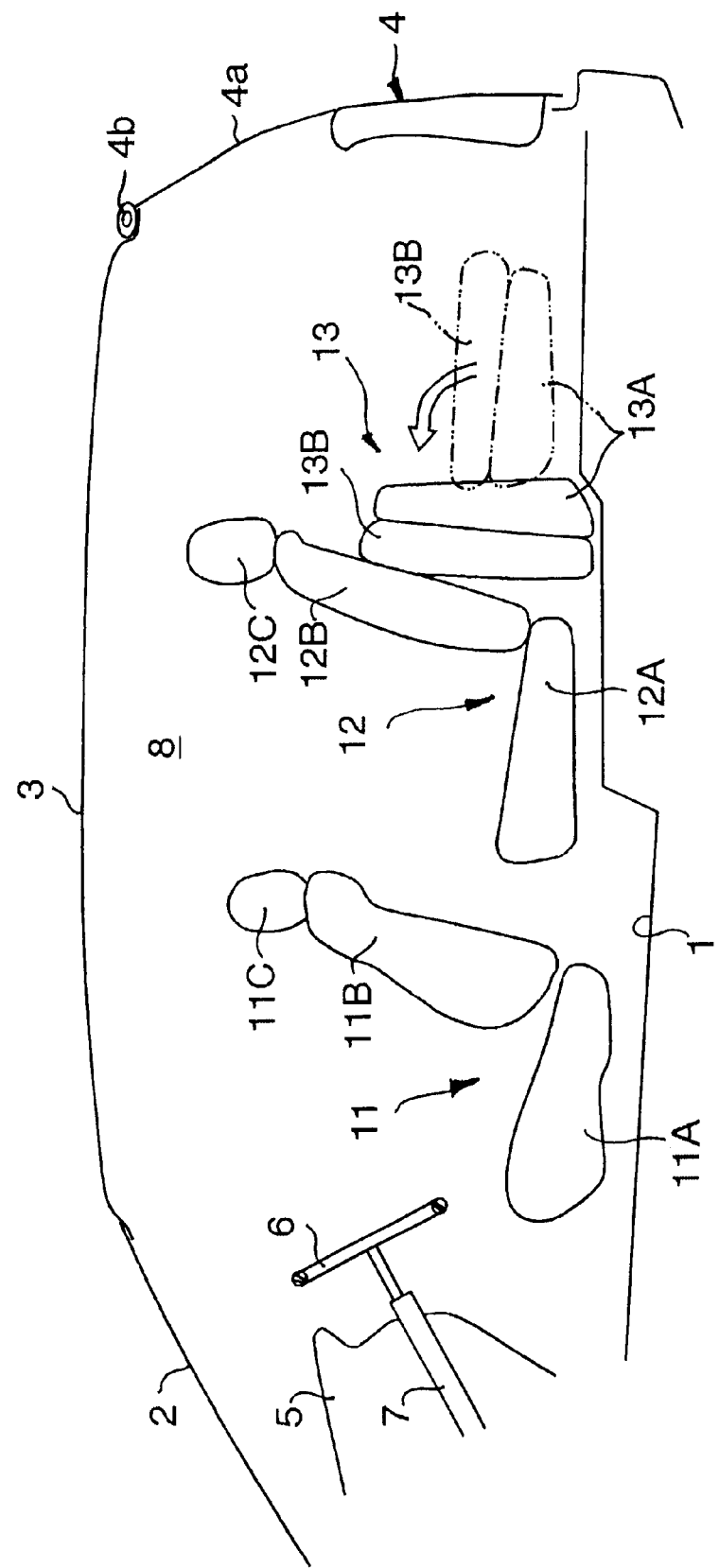
FIG. 3 is a schematic side view showing the rear body structure in which only a third row of seats are in a double-folded position.
Figure 4:
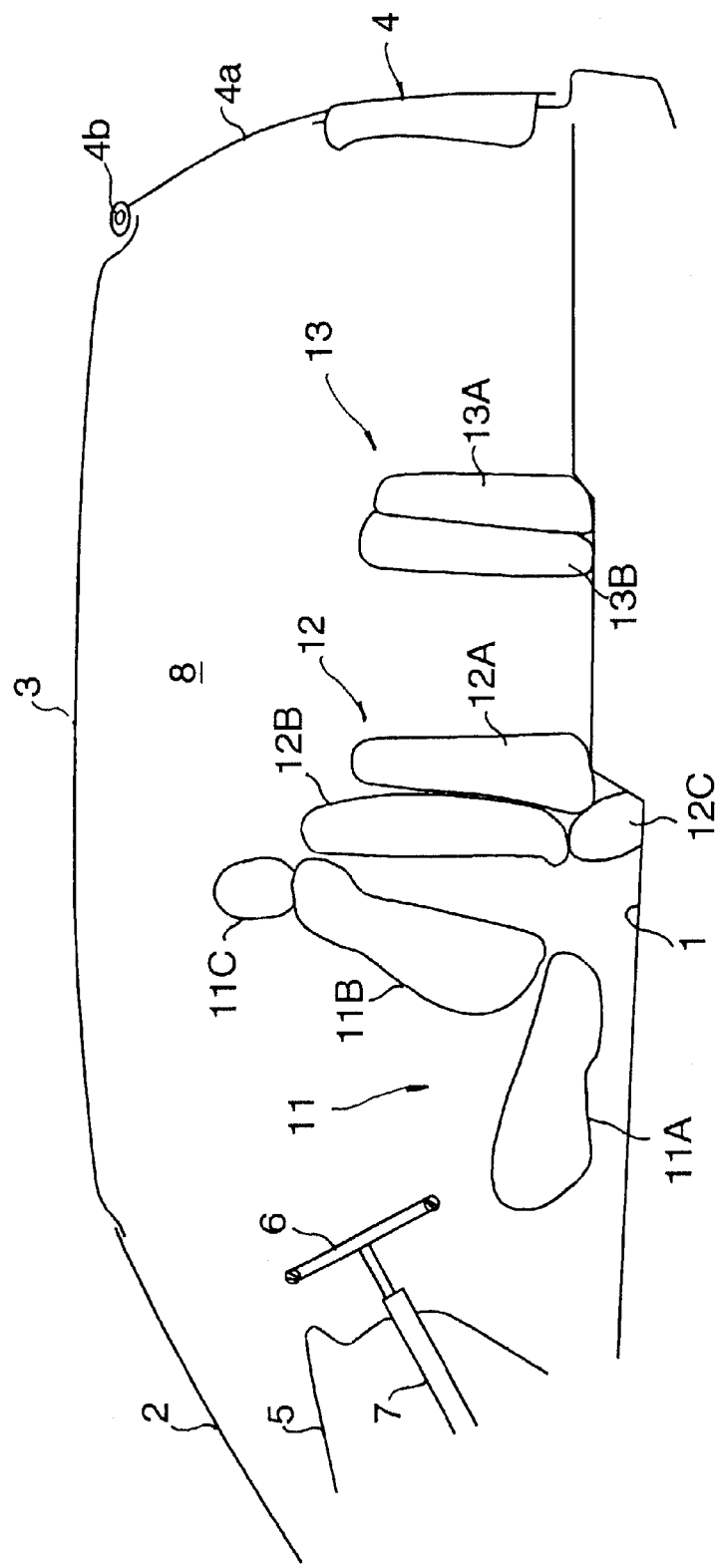
FIG. 4 is a schematic side view showing the rear body structure in which second and third rows of seats are in their double-folded positions.

FIG. 3 shows a state in which only the third row seats 13 are in their double-folded positions. FIG. 4 shows a state in which both second and third rows of seats 12 and 13 are in their double-folded positions. The seats 12 and 13 are moved into the double-folded position by turning the seatbacks 12B, 13B forward as one whole through about 90 degrees around a transverse shaft positioned at the lower front ends of the seat cushions 12A and 13A from a position in which the seatbacks 12B and 13B are in the folded shown in FIG. 2. Before turning the seats 12 and 13 into the double-folded position, the headrests 12C and 13C are detached from the seatbacks 12B and 13B. As apparent in FIG. 4, when the second and third rows of seats 13 are in the double-folded positions, the tops of the second row of seats 12 are positioned higher than the tops of the third row of seats 13. In the double-folded position, the second row of seats 12 prevent goods or luggage in the passenger compartment 8 from accidentally moving toward the first row of seats 11. Furthermore, because the third row of seats 13 are low in height, the third row of seats 13 do not block the passenger's rear view even while the third row of seats 13 are in the double-folded positions. A substantially horizontal board 17 extending over the full width of the vehicle body in a transverse direction of the vehicle body may be detachably installed behind the third row of seats 13. When the plane is provided by the back of the seatbacks 11B, 12B, 13B, the horizontal board 17 is even with the plane provided by the back of the seatback 13B in the folded position. The front edge of the board 17 is located near the lower portions of the seatbacks 13B of the third row of seats 13 in the folded position, and the rear edge of the board 17 is located near the back door 4. The flat plane provided by the back of the seatbacks 13B is expanded and broadened by the board 17.

When the seatbacks 13B of the third row of seats 13 are in the upright positions, the board 17 functions as a shelf or partition wall which divides a cargo room behind the third row of seats 13 into upper and lower sections. Furthermore, when the seatbacks 13B of the third row of seats 13 are in the upright positions, the board 17 may be changed in position such as to be situated vertically, so as thereby to function as a protection board for preventing luggage in the cargo room from hitting the third row of seats 13.

Figure 5:
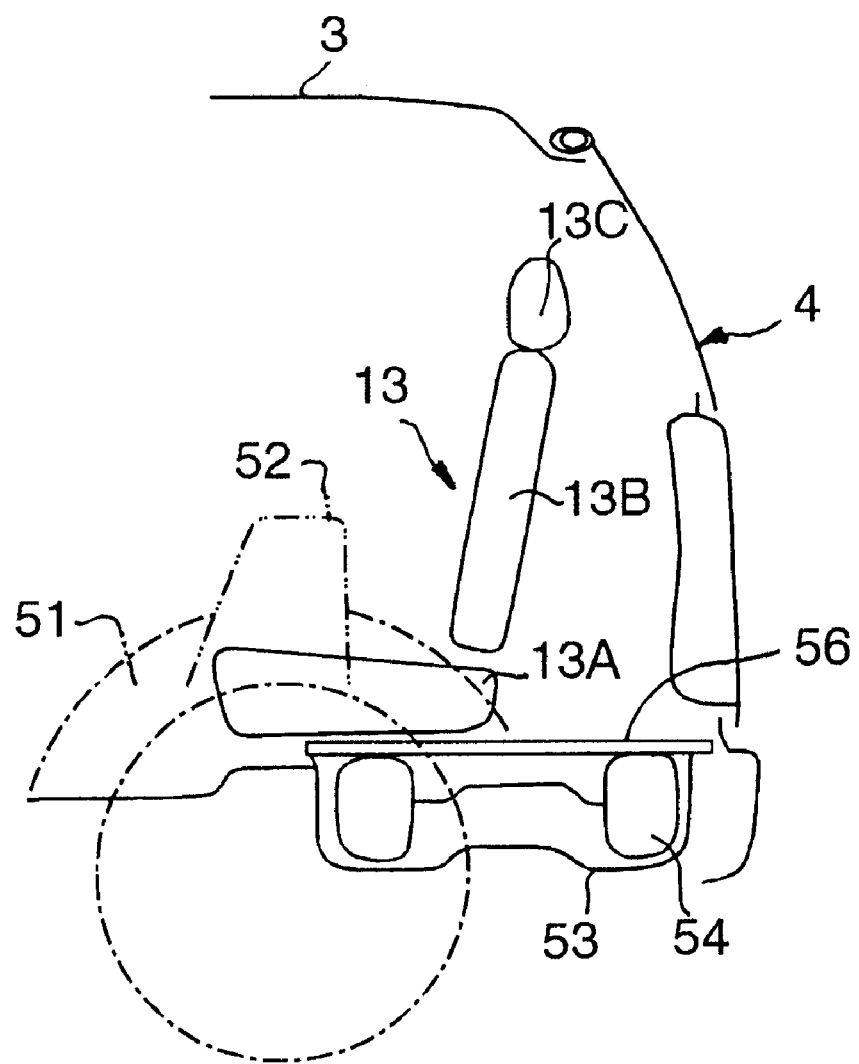
FIG. 5 is a schematic side sectional-view of the rear section of the vehicle body in which the vehicle structure of the invention is applied.
Figure 6:
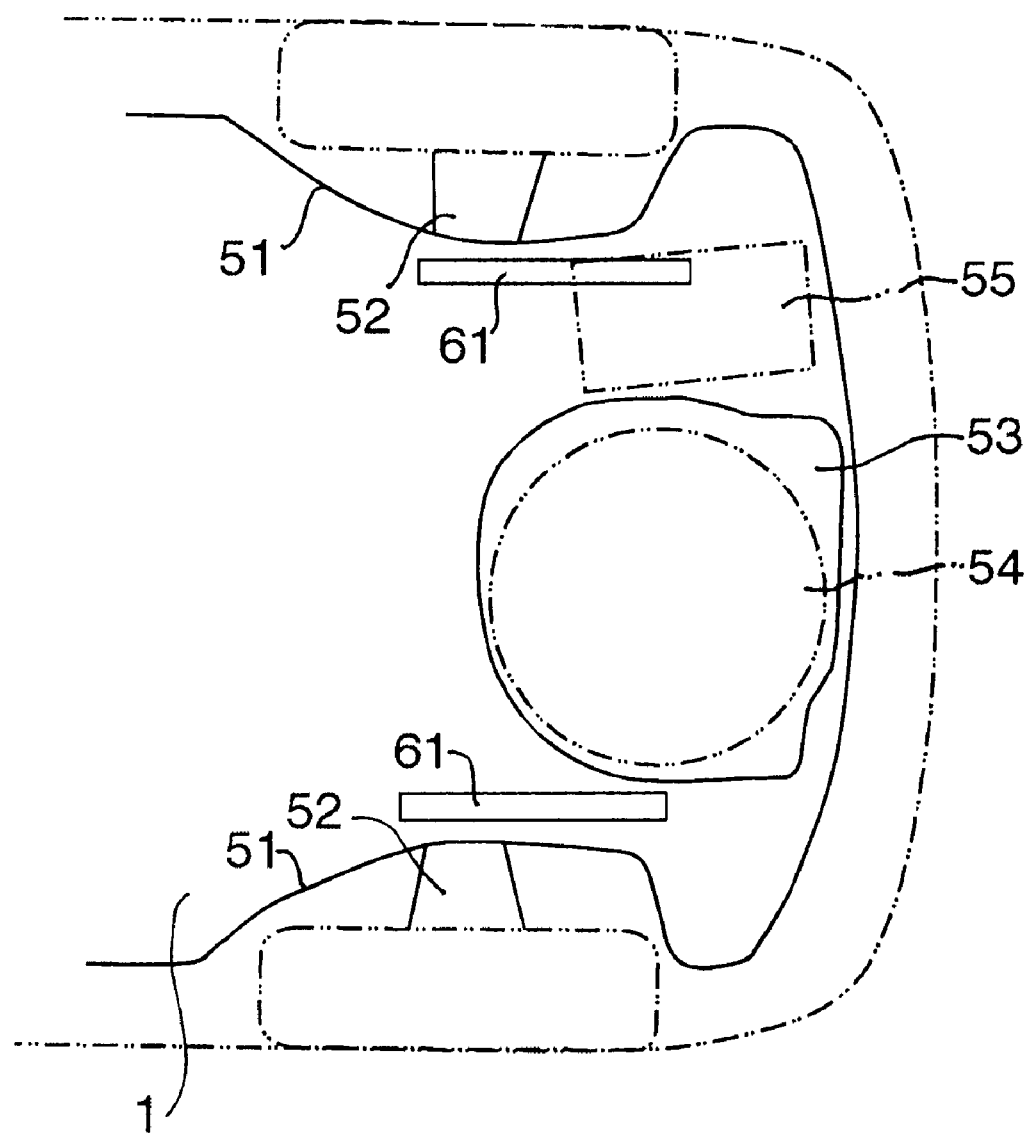
FIG. 6 is a schematic plan view of the rear body section of the vehicle.
Figure 7:
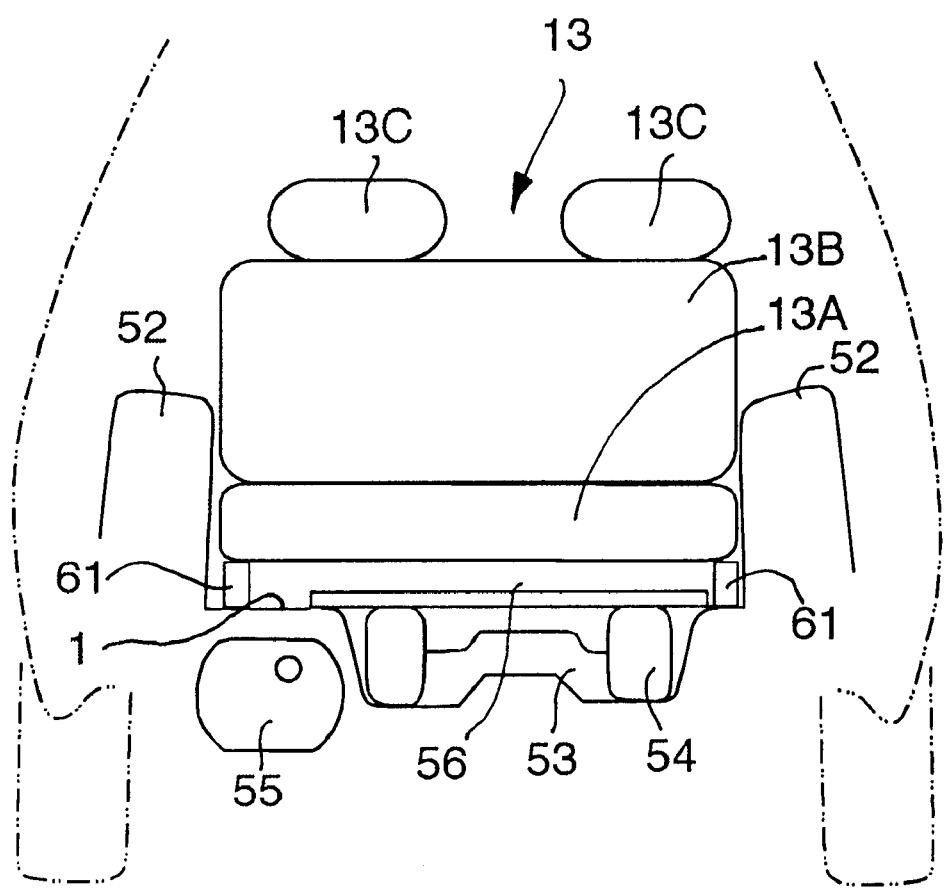
FIG. 7 is a schematic elevation view of the rear body section of the vehicle as viewed from the front of the vehicle.

FIGS. 5 to 8 show the rear body structure of the vehicle. FIG. 5 shows a cross sectional part of the floor panel 1, different from the cross sectional part of the floor panel 1 shown in FIGS. 1 to 4, which is taken along line passing through a pan 53 for storing the spare tire 54 therein. The vehicle is of a front wheel-front drive (FF) type in which the engine is mounted in the front section of the vehicle body and only the front wheels are driven. A pair of rear wheel houses 51 are formed at the rear part of the floor panel 1. A suspension tower 52 is installed to each rear wheel house 51. The pan 53 is formed nearly in the central part of the floor panel 1 part in the traverse direction behind the suspension tower 52 and shaped like a deep plate opening upward and having a substantially horizontal bottom. The spare tire 54 is placed in a substantially horizontal position in the pan 53. The rear edge of the pan 53 is located near the back door 4. Shown by a reference 55 in FIGS. 6 and 7 is an exhaust muffler.

The seat cushions 13A of the third row of seats 13 are positioned above the pan 53. Specifically, in this embodiment, the seat cushion 13A is installed so that the part of the seat cushion 13A from the middle to the rear end in the lengthwise direction is located to overlap the pan 53. In other words, the seat cushion 13A is installed so that the seat cushion 13A is located to overlap the part from the middle to the front end of the pan 53 in the lengthwise direction. As shown in FIGS. 5 and 7, the pan 53 is usually covered with a lid 56 like a sheet.

Figure 8:
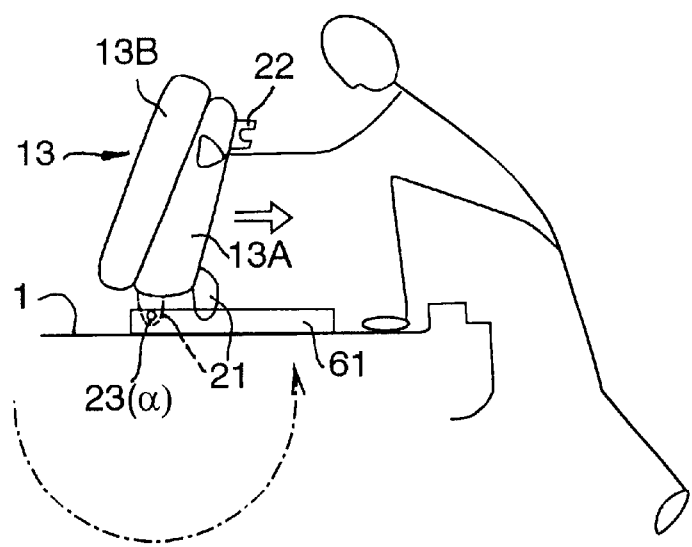
FIG. 8 is a schematic side sectional view showing specifically a process of removing the third row of seats from the vehicle.
Figure 9:
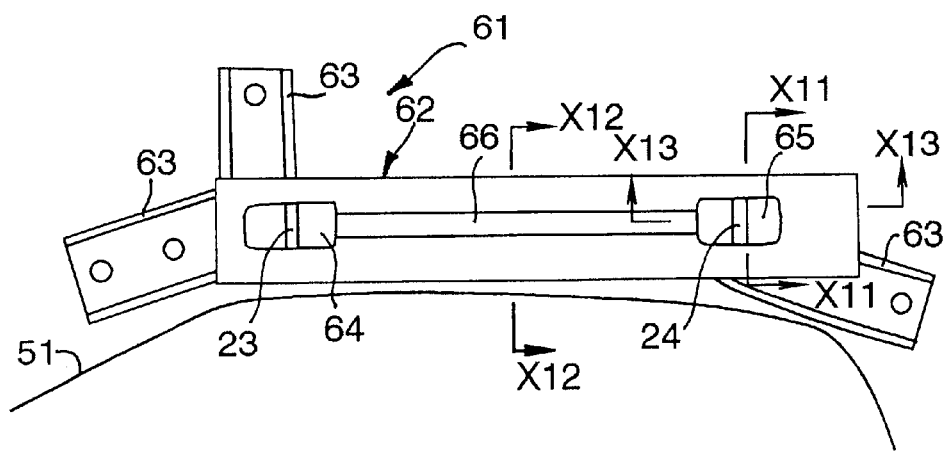
FIG. 9 is a schematic plan view showing essential part of a guide rail.
Figure 10:
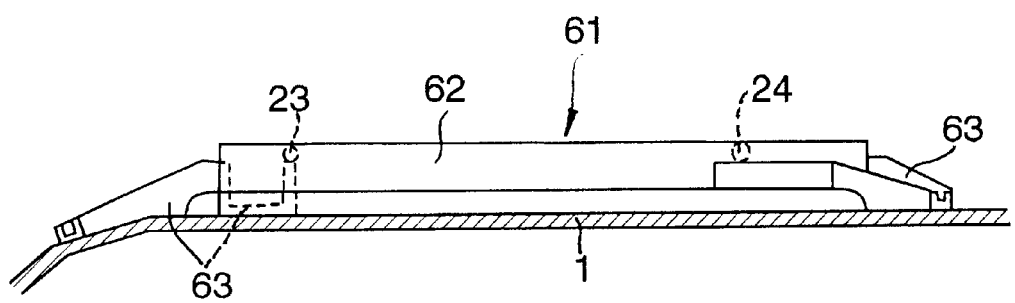
FIG. 10 is a schematic side elevation view showing the essential part of the guide rail.
Figure 11:
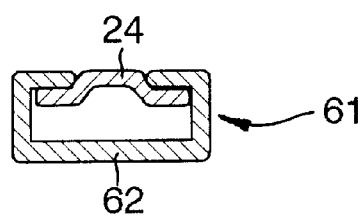
FIG. 11 is a sectional view taken along line X11—X11 in FIG. 9.
Figure 12:
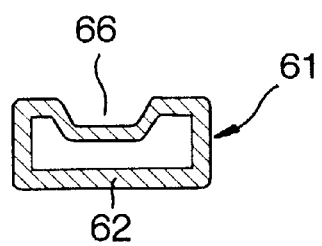
FIG. 12 is a sectional view taken along line X12—X12 in FIG. 9.
Figure 13:
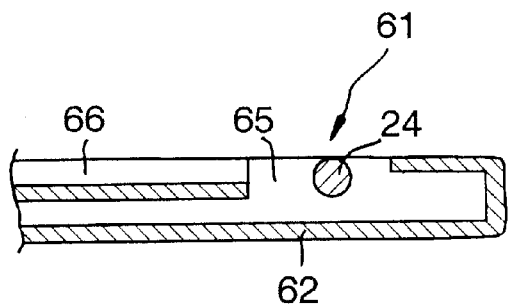
FIG. 13 is a sectional view taken along line X13—X13 in FIG. 9.
Figure 14:
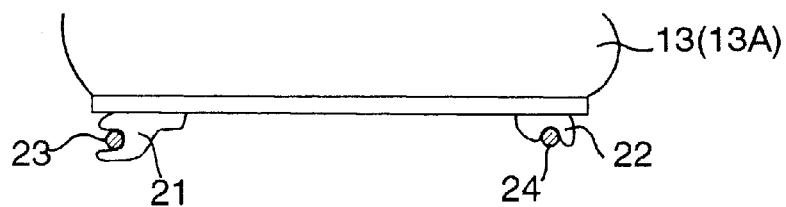
FIG. 14 is a schematic side elevation view showing an arrangement of a retainer bracket of a seat cushion and a retainer pin of the guide rail.

The left-hand and right-hand guide rails 61 extending in the lengthwise direction are secured to the floor panel 1 on both sides of the pan 53. The guide rails 61 ordinarily function as brackets for installing the third row of seats 13 on in the floor panel 1. The seat cushion 13A of the third row of seat 13 is fixed to the guide rails 61 by front and rear locking mechanisms. As shown in FIG. 8, the third row of seats 13 are moved into the double-folded position by turning the seats as one whole forward through about 90 degrees around a transverse axis α positioned at the lower front edge of the seat cushion 13A while the locking mechanisms is released. A locking bracket 21 is provided at the lower front edge of the seat cushion 13A and is able to engage with and disengage from a locking pin 23 as the transverse axis α. When the third row of seats 13 are turned forward as one whole through about 90 degrees around the transverse axis α and the lid 56 is removed, the spare tire 54 can be put in and out from the pan 53. The seat cushion 13A of the third row of seat 13 is detachable from the guide rails 61. FIG. 8 shows the process by which the third row of seat is detached. The third row of seat 13 is detached from the guide rails 61 in the following manner. The third row of seats 13 are turned as one whole forward around the transverse axis α into the double-folded position while the locking mechanism is released, and then, slid backward on the guide rails 61 with the locking bracket 21 remaining placed on the guide rails 61. The third row of seats 13 is lifted up to when the locking bracket 21 is positioned in the rear end of the guide rails 61 and then taken out of the vehicle. The third row seat 13 is reinstalled onto the floor panel 1 in the reverse manner.

Figure 15:
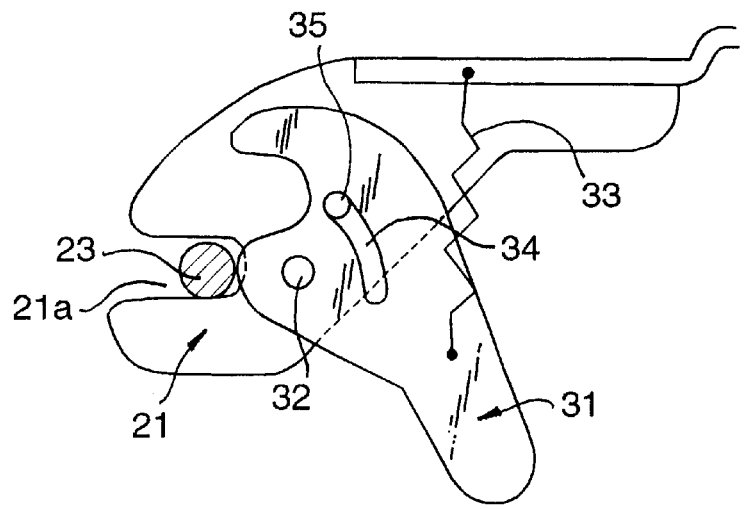
FIG. 15 is a schematic side elevation view showing a front locking mechanism in an unlocking state.
Figure 16:
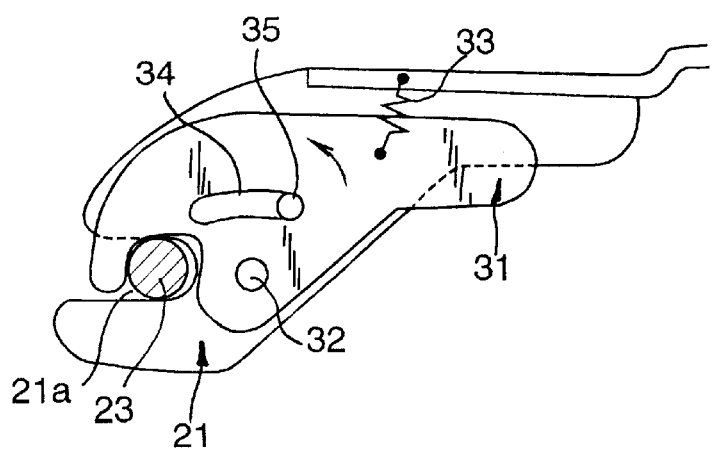
FIG. 16 is a schematic side elevation view showing the front locking mechanism in a locking state.
Figure 17:
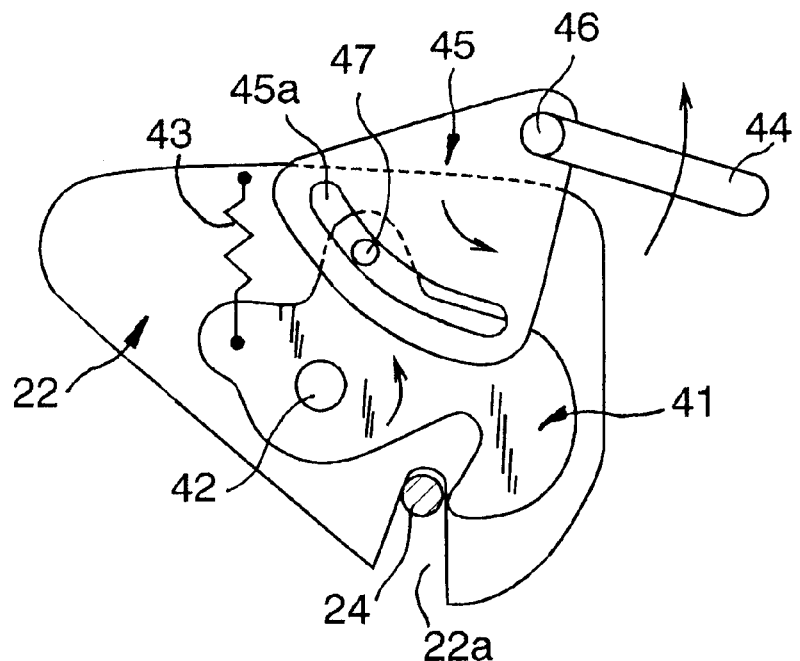
FIG. 17 is a schematic side elevation view showing a rear locking mechanism in an unlocking state.
Figure 18:
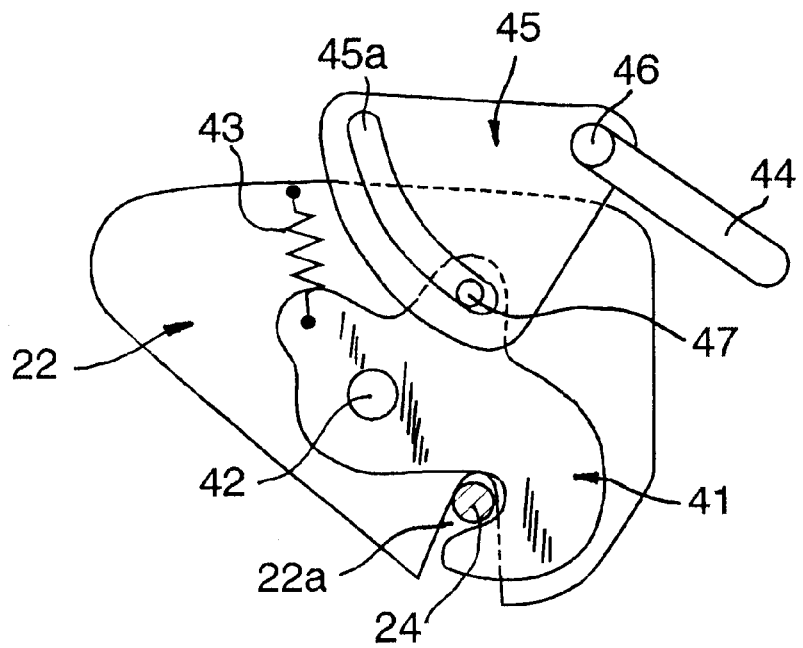
FIG. 18 is a schematic side elevation view showing the rear locking mechanism in a locking state.

FIGS. 9 to 18 show the details of the guide rails 61 and the locking mechanisms for the seat cushions 13A which are detachable from the guide rails 61. First of all, the guide rail 61 is explained with reference to FIGS. 9 to 13. The guide rail 61 has an elongated main rail 62 which having a closed section and extends in the longitudinal direction. Two or more brackets 63, which are welded or otherwise secured, to the main rail 62, are secured to the floor panel 1 by means of the bolts. A pair of notches 64 and 65 are formed in the upper wall of the main rail 62 at the front and rear ends thereof. The locking pin 23 (which is the transverse axis α for rotation), short in length and extending in the transverse direction, is situated in the front notch 64 and welded to the main rail 62 at the front notch 64. The locking pin 24, short in length and extending in the transverse direction, is situated in the rear notch 65 and welded to the main rail 62 at the rear notch 65. A guide groove section 66 extending in the longitudinal direction is formed and curved slightly downward on the upper wall of the main rail 62 between the front and rear notches 64 and 65. The front locking bracket 21 is fixed to the front end of the lower side of the third row of seat 13, in particular the seat flame of the third row seat 13. A rear locking bracket is fixed to the rear end of the lower side of the third row seat 13, in particular the seat flame of the third row seat 13. As shown in FIGS. 15 and 16, the front locking bracket 21 at the front end is formed with a locking gate 21a opening forward. As shown in FIGS. 17 and 18, the rear locking bracket 22 at the lower end is formed with a locking gate 22a opening downward. The locking gate 21a of the front locking bracket 21 is releaseably engaged with the locking pin 23. The locking gate 22a is releaseably engaged with the locking pin 24. A striker 31 is supported on the front locking bracket 21 by a pin 32 so as to swing around the pin 32. The front locking mechanism mainly comprises the front locking bracket 21, the locking pin 23 and the striker 31. When the locking gate 21a of the front locking bracket 21 is engaged with the locking pin 23 and the striker 31 is greatly swung clockwise as viewed in FIG. 15, the locking gate 21a is unblocked (unlocking position), allowing the engagement between the front locking bracket 21 and the locking pin 23 to be released by moving the front locking bracket 21 rearward relatively to the lock pin 23. When the locking gate 21a is engaged by the locking pin 23 and the striker 31 is swung counterclockwise as viewed in FIG. 15, the locking gate 21a is blocked by the striker 31 (locking position). In the locking position, the front locking bracket 21 can not be disengaged from the lock pin 23.

The striker 31 is biased with upward by a tension spring 33 so as to swing counterclockwise as viewed in FIG. 15 or 16. The striker 31 is manually swung clockwise against the tension spring 33. A circular-arcuate guide slot 34 is formed in the striker 31 and a guide pin 35 is fixed to the front locking bracket 21. The guide slot 34 centers on the pin 32. The guide pin 35 is received in the guide slot 34 so as to guide a turn of striker along the guide slot 34. A turn of the striker 31 greater than a specified angular interval is restricted by the engagement between the guide slot 34 and the guide pin 35. It is allowed that the guide slot 34 is formed in the front locking bracket 21 and the guide pin 35 is fixed to the striker 31.

As shown in FIGS. 17 and 18, a striker 41 is supported on the rear locking bracket 22 by a pin 42 so as swing around the pin 42. The rear locking mechanism mainly comprises the rear locking bracket 22, the locking pin 24 and the striker 41. When the locking gate 22a is engaged by the locking pin 24 and the striker 41 is swung clockwise, the locking gate 22a is unblocked (unlocking position). In the unlocking position, the rear locking bracket 22 can be disengaged from the locking pin 24 by upward movement of the rear locking bracket 22 relative to the locking pin 24. While the locking gate 22a is engaged by the lock pin 24, the striker 41 is swung counterclockwise, blocking the locking gate 22a (locking position). In the locking position, the rear locking bracket 22 cannot be disengaged from the lock pin 24. The striker 41 is biased upward by a tension spring 43 so as to swing counterclockwise. The striker 41 is manually swung clockwise against the tension spring 43.

A cam plate 45 formed with an arcuate cam slot 45 is supported on the seat flame of the third row of seat 13 by a pin 46 so as to swing around the pin 46. The cam plate 45 is swung by a turn of a manual lever 44 made by a passenger. A guide pin 47 is fixed to the striker 41 to mount the cam plate 45 thereon. The arcuate cam slot 45 is shaped so as to increase the distance from the pin 46 gradually in a circumferential direction with respect to the pin 46. When the manual lever 44 is swung counterclockwise as viewed in FIG. 17, the cam plate 45 and the striker 41 are forced to swing counterclockwise around the pins 46 and 42, respectively (movement for unlocking). When the manual lever 44 is freed, the cam plate 45 and the striker 41 return to the locking positions by the tension spring 43. If the manual lever 44 is operationally connected to the striker 31 through a link mechanism or a link wire, the striker 31 and the striker 41 can be simultaneously brought into the locking position or into the unlocking position only by operating the manual lever 44. A guide slot (not shown) like the guide slot 34 is formed in the striker 41 and a guide pin (not shown) like the guide pin 35 is fixed to the rear lock bracket 22. A rotation of the striker 41 greater than a specified angular interval is restricted by the engagement between the guide slot and the guide pin similarly to the striker 31. Of course, it is allowed that the guide slot is formed to the rear lock bracket 22 and the guide pin is fixed to the striker 41.

The third row of seat 13 is detached from the vehicle body in the following manner. First, when the seatback 13B is in the folded position, at least the rear locking mechanism is released and the third row of seats 13 are turned forward around the locking pin 21 (the transverse axis α) as one whole. Subsequently, when the front locking mechanism is released, the front locking bracket 21 is disengaged from the locking pin 23 by the backward and upward movement of the third row of seats 13 and is placed on the guide groove section 66. Thereafter, as shown in FIG. 8, the third row of seats 13 in the double-folded position are slid backward on the guide groove section 66 with the locking bracket 21 remaining placed on the guide rail 61.

According to the above embodiment, as the spare tire 54 is kept substantially horizontal in the pan 53 installed behind the suspension tower 52, in the event of an occurrence of a rear end collision, the spare tire 54 props the rear end section of the vehicle body, reducing deformation of the rear body section (including the back door 4) which leads to damage against the third row of seats 13.

The seat cushion 13A of the third row of seats 13 is installed above the pan 53, and hence the spare tire 54, especially the seat cushion 13A is located to overlap the pan 53, and hence the spare tire 54, from the middle to the front end of the pan 53 thereof, it is possible to prevent the spare tire 54 especially at the front from moving up. And, as the third row of seats 13 can be turned forward as one whole through almost 90 degrees around the pin 23 which works as the transverse axis a of the seat cushion 13A and the lid 56 is removable, the spare tire 54 can be easily put in and out from the pan 53. Furthermore, as the guide groove section 66 extending in the longitudinal direction is formed on the upper wall of the main rail 62 so that the third row of seats 13 slide backward with the locking bracket 21 placed on the guide groove section 66, the third row of seats 13 located above the spare tire 54 can be easily detached from the floor panel 1 (the guide rail 61) and reinstalled in the floor panel 1 (the guide rail 61).

The second row of seats 12 have a locking mechanism like the locking mechanism for the third row of seats 13 shown in FIGS. 14 to 18. As the second row of seats 12 is slid in the lengthwise direction, the locking pins 23 and 24 are mounted on the upper rail which is slidable relative to the lower rail fixed to the floor panel 1. In this instance, while the second row of seats 12 is moved into the double-folded position by a forward turn around the front locking pin 23, it may be moved into the double-folded position after it has been detached from the upper rail, and hence the vehicle body.

Although the present invention has been described in term of a specific embodiment thereof, it is possible to modify and alter details thereof without departing from the spirit of the present invention. For instance, it is allowed that while the seatback 11B of the passenger's seat is folded forward, the seatback 11B of the driver's seat can not be folded forward. Also, it is allowed that the seatbacks 12B and 13B of the second and third rows of seats can be folded forward and however the seatbacks 11B of the first row of seat can not be folded forward. In addition, the vehicle may have only two rows of seats, namely front or first and back or second rows of seats. In this case, the second row of seats are installed above the front portion of the pan 53.

What is claimed is:

1. A rear body structure for a vehicle body, which comprises:
   a floor panel with a pan entirely opening upward for storing a spare tire therein formed at a rear section thereof;
   a rear seat array having a rear seat cushion located to overlap the pan and hinged along a front edge thereof so as to be swingable forward about the front edge and a seatback foldable over the rear seat cushion,
   a pair of guide rails formed with guides, respectively, which extend horizontally in a lengthwise direction of the vehicle body on opposite sides of said pan and formed with a swivel axis at front ends thereof for double-folding said rear seat array;
   a locking mechanism through which said rear seat cushion is detachably locked to said guide rails; and
   a lid removably disposed between said pan and said rear seat array to close said pan;
   wherein said rear seat array opens entirely said pan so as to allow said spare tire to be put in and out of said pan in a vertical direction when said rear seat cushion is swung up past an approximately right angle after folding said rear seatback over said rear seat cushion so as thereby to place said rear seat array in a double-folded position and said lid is removed from said pan, and said seat cushion is supported in said double folded position by said guide rails and slides back on said guides for removal when unlocked from said guide rails through said locking mechanism.

2. A rear body structure as defined in claim 1, wherein said pan is formed so as to situate said spare tire in a horizontal plane.

3. A rear body structure as defined in claim 1, wherein said seat cushion is supported on said floor panel so as to slide back and forth within a specified extent and is retained to said floor panel at opposite sides of a part of said seat cushion which overlaps said panel when said seat cushion is located in a rearmost position of said specified extent.

4. A rear body structure as defined in claim 3, wherein said seat cushion at a rear end is detachably mounted on said floor panel.

5. A rear body structure as defined in claim 1, wherein said pan is positioned behind a part of said floor panel to which suspension towers for rear wheels are installed.

6. A rear body structure as defined in claim 1, wherein said seat cushion is located above at least a front part of said pan.

7. A rear body structure as defined in claim 1, and further comprising:
   a middle seat array mounted to said floor panel in front of said rear seat array and having a middle seat cushion and a middle seatback foldable over said middle seat cushion; and
   a front seat array mounted to said floor panel in front of said middle row seat array and having a front seat cushion and a front seatback foldable over said front seat cushion;
   wherein said front, middle and rear seat arrays are gradually elevated in vertical position in this order, said front, middle and rear seat cushions are approximately equal in thickness to one another, and said front, middle and rear seatbacks become gradually thin in this order so as to form an approximately flat plane over said front, middle and rear seatbacks when said front, middle and rear seatbacks are folded forward.

8. A rear body structure as defined in claim 7, and further comprising a head rest attached to each one of said front, middle and rear seatbacks, said head rests of said middle and rear seatbacks being situated between adjacent said seatbacks when said front, middle and rear seat back are folded forward.

9. A rear body structure as defined in claim 1, wherein said pan is offset laterally on one side of a longitudinal center line extending from the back to the front of the vehicle so as to form a space on another side of said longitudinal centerh line in which an exhaust muffler is disposed.

10. A rear body structure as defined in claim 1, wherein a part of said floor panel before said rear seat array is lower in vertical position than another part of said floor panel on which said rear seat array is placed such that the front end of said rear seat array is positioned on said lowered part of said floor panel when said rear seat array is in said double-folded position.

11. A rear body structure as defined in claim 10, and further comprising a middle seat array mounted to said floor panel in front of said rear seat array and having a middle seat cushion and a middle seatback foldable over said middle seat cushion; and
   a front seat array mounted to said floor panel in front of said middle seat array and having a front seat cushion and a front seatback foldable over said front seat cushion;
   wherein a part of said floor panel before said rear seat array is lower in vertical position than another part of said floor panel on which said rear seat array is placed such that the front end of said rear seat array is positioned on said lowered part of said floor panel when said rear seat array is in said double-folded position, and said rear seat array in said double folded position is lower in vertical position than said middle seat array in said double folded position.

12. A rear body structure for a vehicle body, which comprises:
   a floor panel with a pan entirely opening upward for storing a spare tire therein formed at a rear section thereof;
   a rear seat array having a rear seat cushion located to overlap the pan and hinged along a front edge thereof so as to be swingable forward about the front edge and a seatback foldable over the seat cushion,
   a pair of guided rails formed with guides, respectively, which extend horizontally in an lengthwise direction of the vehicle body on opposite sides of said pan and formed with a swivel axis at front ends thereof for double-folding said rear seat array;
   a locking mechanism through which said seat cushion is detachably locked to said guide rails;
   a lid removably disposed between said pan and said rear seat array to close said pan; and
   a part of said floor panel before said rear seat array is lower in vertical position than another part of said floor panel on which said rear seat array is placed such that the front end of said rear seat array is positioned on said lowered part of said floor panel when said rear seat array is in said double-folded position; and said rear seat array in said double folded position is lower in vertical position than said middle seat array in said double folded position;

wherein said rear seat array opens entirely said pan so as to allow said spare tire to be put in and out of said pan in a vertical direction when said rear seat cushion is swung up past an approximately right angle after folding said rear seatback over said rear seat cushion so as thereby to place said rear seat array in a double-folded position and said lid is removed from said pan, said seat cushion is supported in said double folded position by said guide rails and slides back on said guides for removal when unlocked from said guide rails through said locking mechanism.

13. A rear body structure as defined in claim 12, wherein said pan is formed so as to situate said spare tire in a horizontal plane.

14. A rear body structure as defined in claim 12, wherein said seat cushion is supported on said floor panel so as to slide back and forth wherein a specified extent and is retained to said floor panel at opposite sides of a part of said seat cushion which overlaps said pan when said seat cushion is located in a rearmost position of said specified extent.

15. A rear body structure as defined in claim 14, wherein said seat cushion at a rear end is detachably mounted on said floor panel.

16. A rear body structure as defined in claim 12, wherein said pan is positioned behind a part of said floor panel to which suspension towers for rear wheels are installed.

17. A rear body structure as defined in claim 12, wherein said seat cushion is located above at least a front part of said pan.

18. A rear body structure as defined in claim 12, and further comprising:

a middle seat array mounted to said floor panel in front of said rear seat array and having a middle seat cushion and a middle seatback foldable over said middle seat cushion; and a front seat array mounted to said floor panel in front of said middle seat array and having a front seat cushion and a front seatback foldable over said front seat cushion;

wherein said front, middle and rear seat arrays are gradually elevated in vertical position in this order, said front, middle and rear seat cushions are approximately equal in thickness to one another, and said front, middle and rear seatbacks become gradually thin in this order so as to form an approximately flat plane over said front, middle and rear seatbacks when said front, middle and rear seat back are folded.

19. A rear body structure as defined in claim 18, and further comprising a head rest attached to each one of said front, middle and rear seatbacks, said head rests of said middle and rear seatbacks being situated between adjacent said seatbacks when said front, middle and rear seat back are folded forward.

20. A rear body structure as defined in claim 12, wherein said pan is offset laterally on one side of a longitudinal center line extending from the back to the front of the vehicle so as to form a space on another side of said longitudinal center line in which an exhaust muffler is disposed.

* * * * *